United States Patent [19]
Gilbert et al.

[11] 4,058,975
[45] Nov. 22, 1977

[54] GAS TURBINE TEMPERATURE SENSOR VALIDATION APPARATUS AND METHOD

[75] Inventors: Kendall E. Gilbert, Schenectady; Daniel Johnson, Rexford; Robert Raymond Macier, Saratoga Springs, all of N.Y.

[73] Assignee: General Electric Company, Schenectady, N.Y.

[21] Appl. No.: 638,852

[22] Filed: Dec. 8, 1975

[51] Int. Cl.$^2$ ............................................. F02C 9/08
[52] U.S. Cl. .................... 60/39.28 T; 73/1 F; 73/116; 73/341; 73/346; 73/349
[58] Field of Search ........ 60/39.03, 39.28 T, 39.28 R; 235/151.3, 151.32, 150.2; 73/1 F, 116

[56] References Cited
U.S. PATENT DOCUMENTS

| | | |
|---|---|---|
| 3,377,848 | 4/1968 | Marvin ............................ 60/39.28 R |
| 3,719,071 | 3/1973 | Hohenberg ........................ 73/116 X |
| 3,764,785 | 10/1973 | Harner ............................ 60/39.28 R |
| 3,789,665 | 2/1974 | Hohenberg ........................ 60/39.28 R |
| 3,899,878 | 8/1975 | Compton ........................ 60/39.28 T |
| 3,911,260 | 10/1975 | Dustin ............................ 60/39.29 X |
| 3,938,319 | 2/1976 | Thomson ........................ 60/39.03 |
| 3,955,359 | 5/1976 | Yannone ........................ 60/39.28 T |

Primary Examiner—Clarence R. Gordon
Attorney, Agent, or Firm—Erwin F. Berrier, Jr.

[57] ABSTRACT

An arrangement for determining the validity of temperature sensor readings of a gas turbine hot gas stream which includes means for comparing each reading to predetermined bounds. The temperature sensors are arranged so that a temperature streak caused by a combustion system malfunction would affect more than one sensor. In some cases, when a suspect reading is identified, the readings from adjacent sensors are examined before the suspect reading is rejected.

1 Claim, 7 Drawing Figures

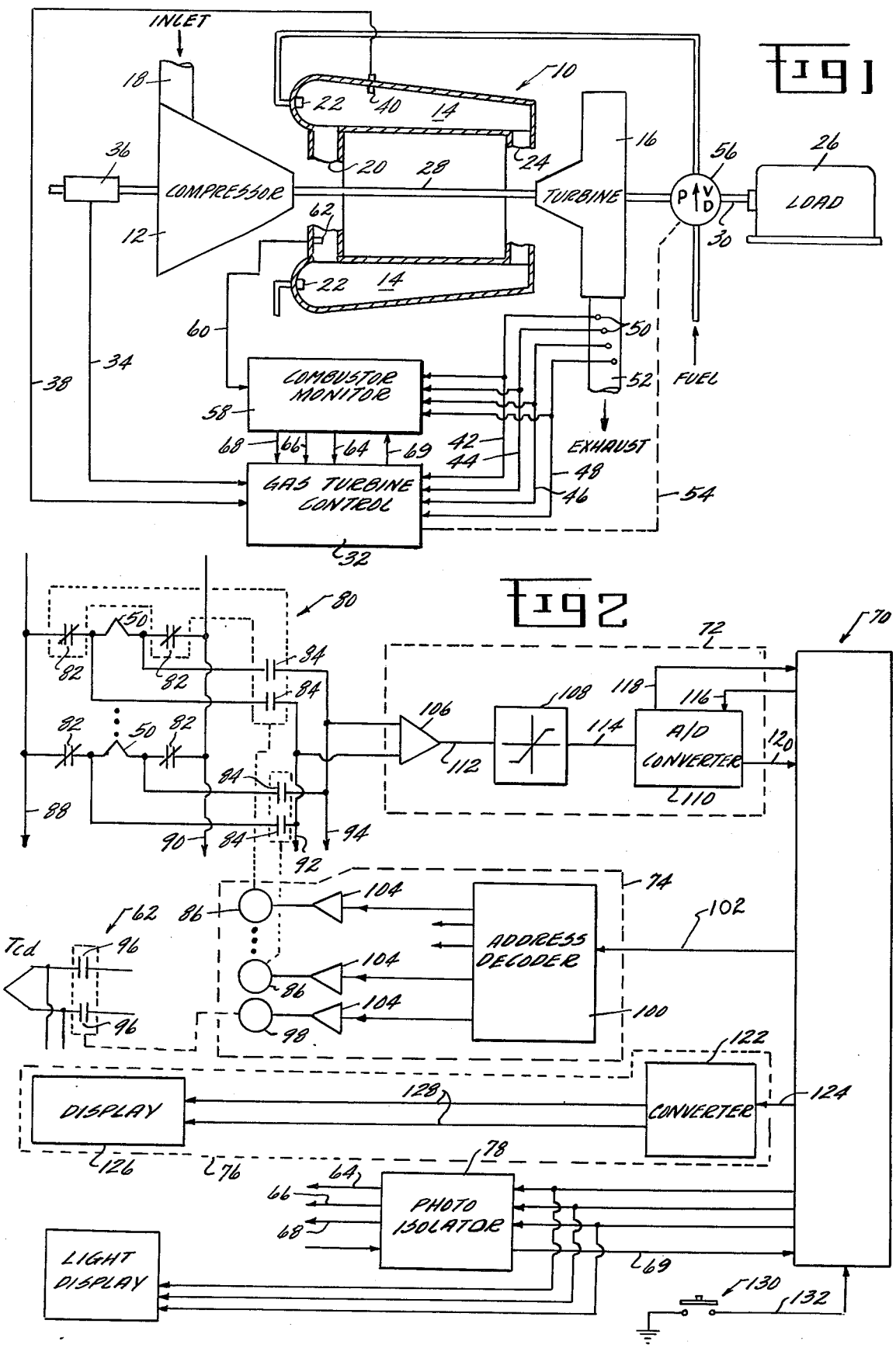

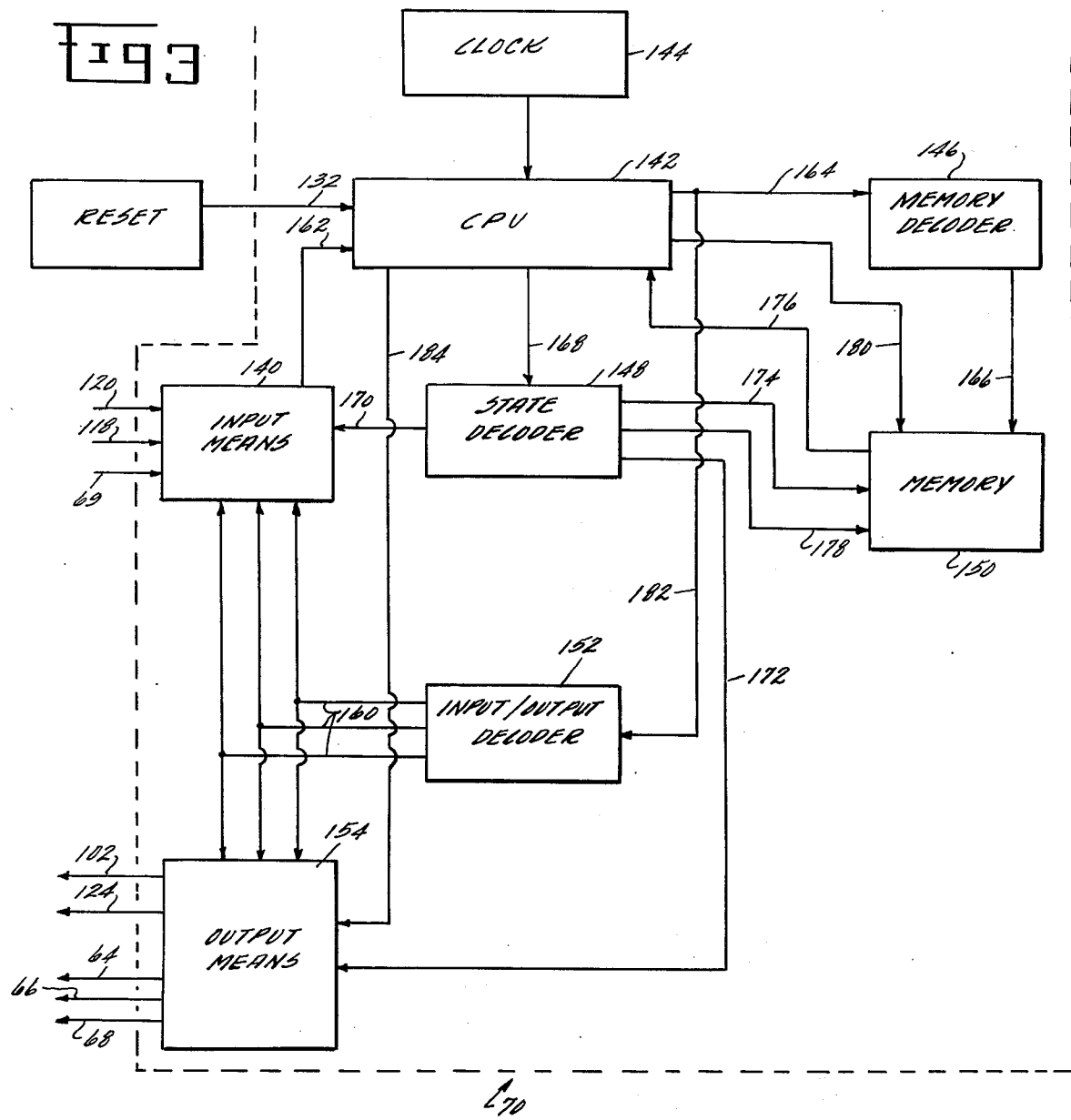

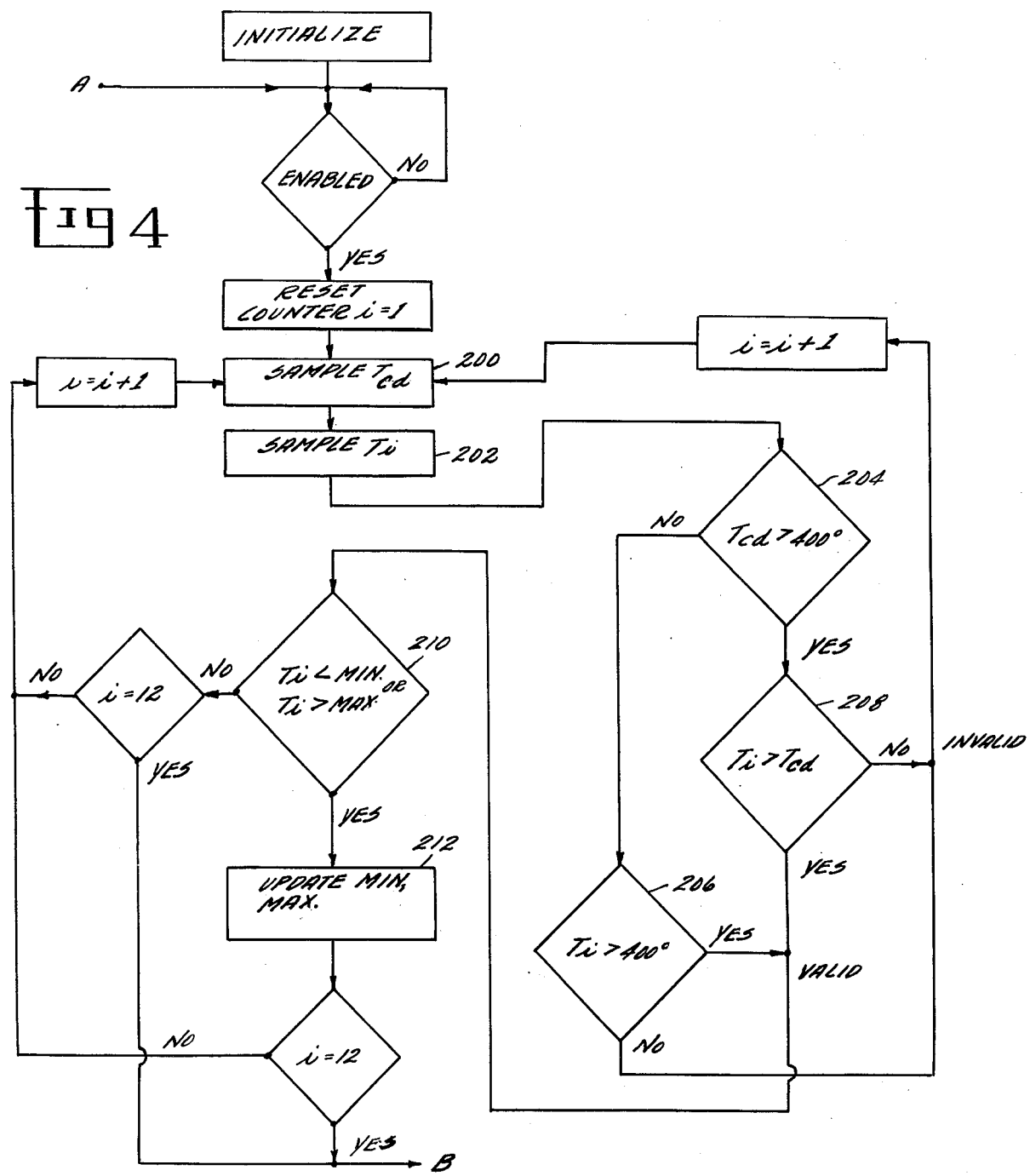

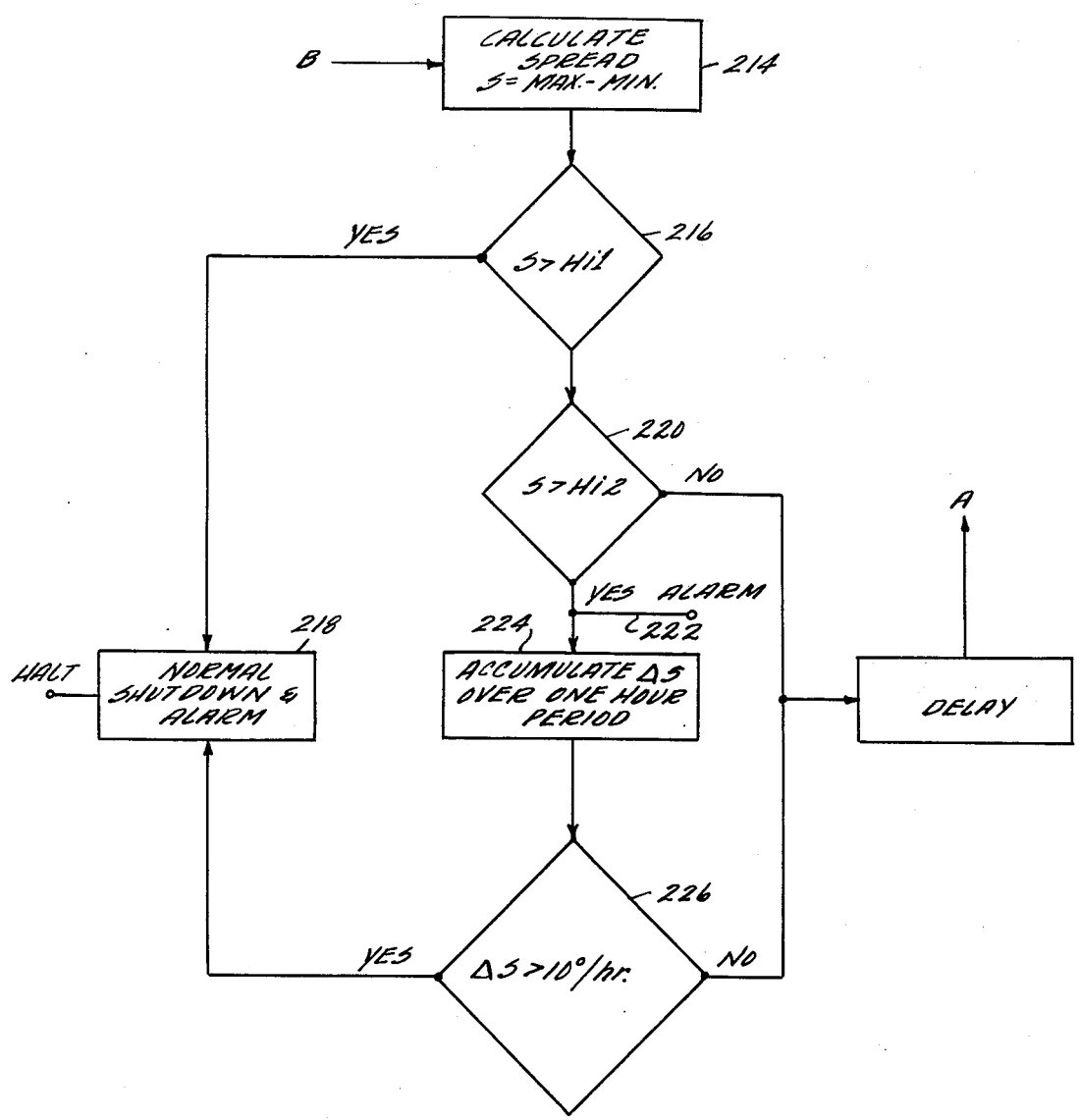

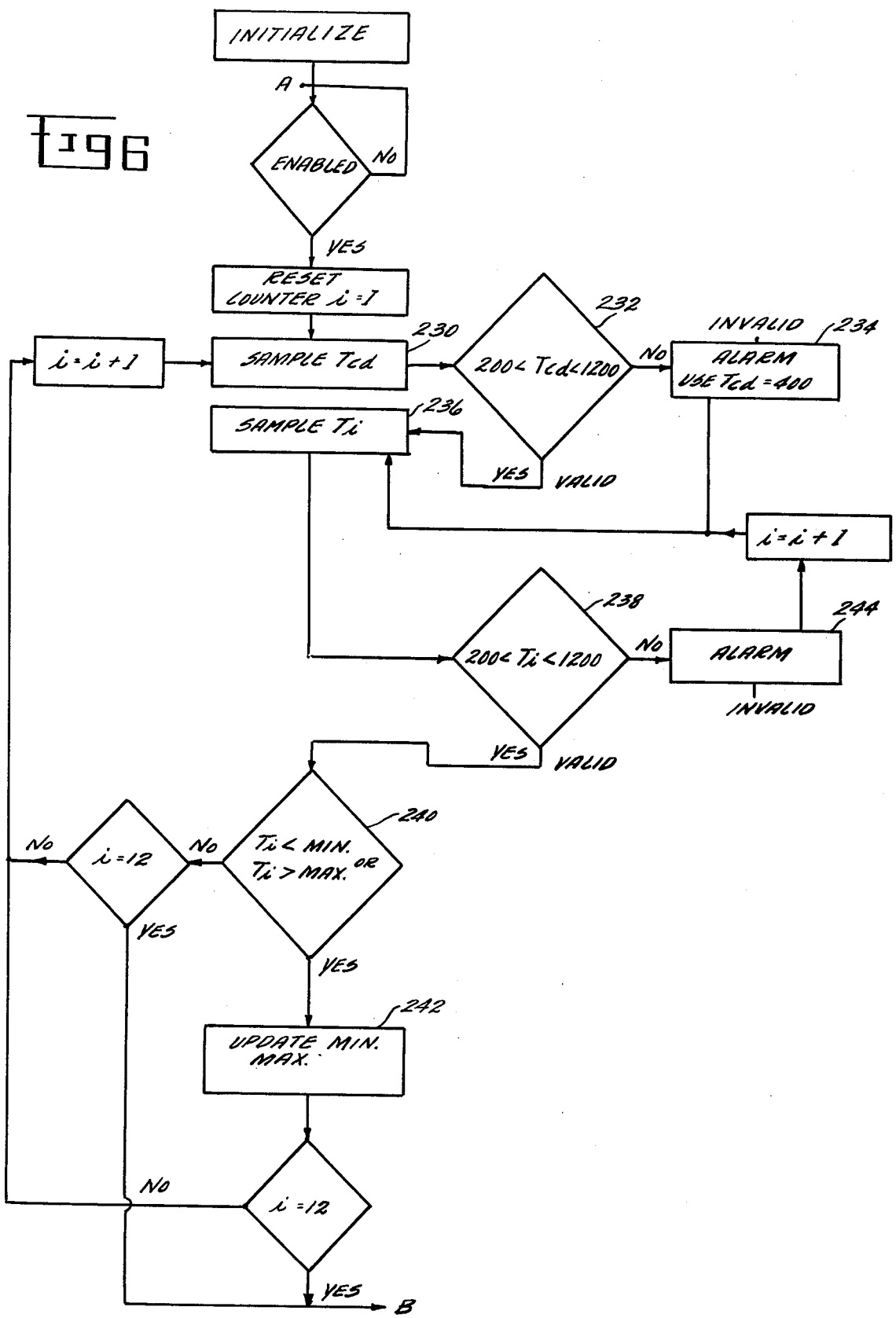

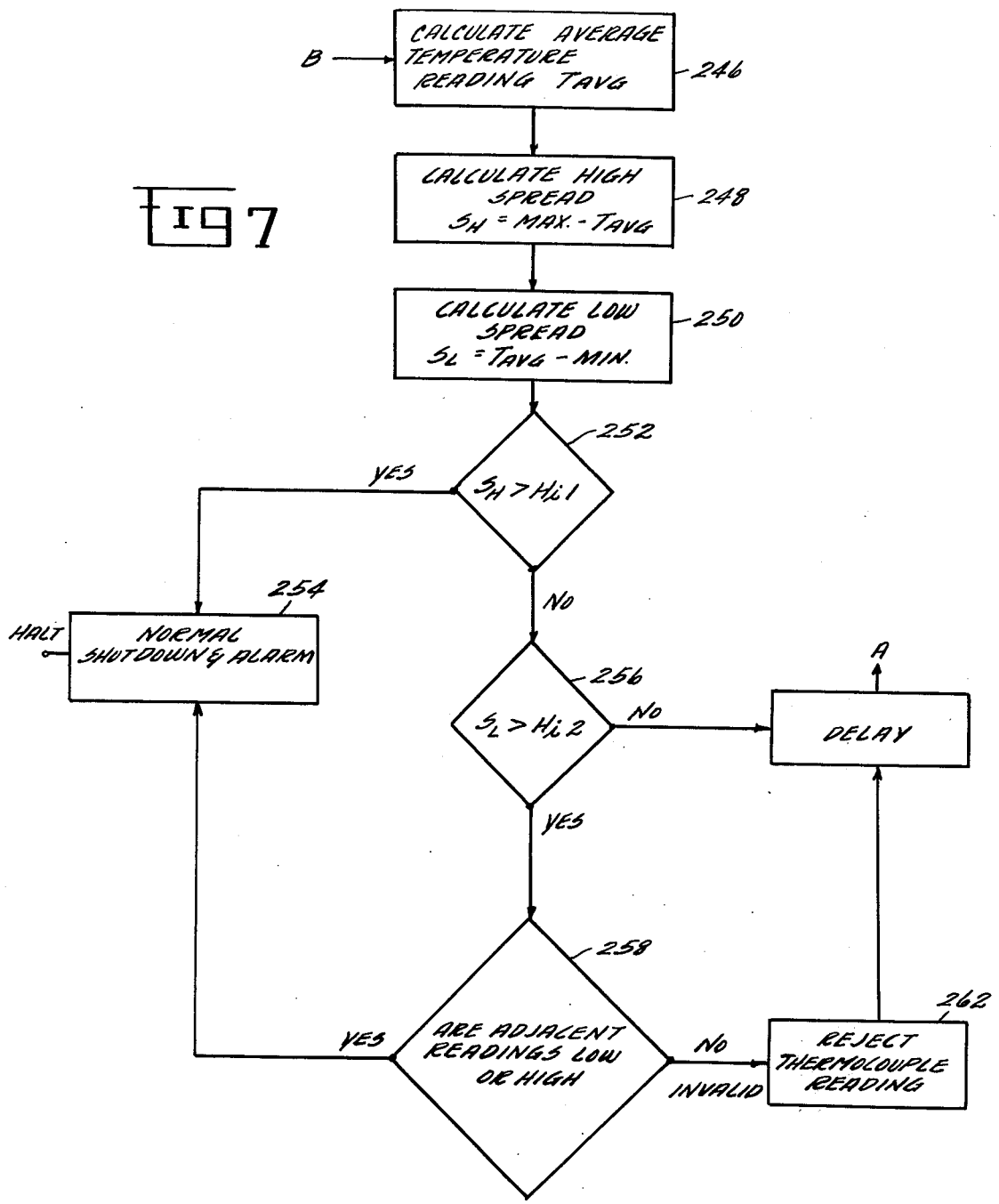

GAS TURBINE TEMPERATURE SENSOR VALIDATION APPARATUS AND METHOD

This invention relates to gas turbines and more particularly to a method and apparatus for validating temperature sensor readings prior to use in a gas turbine control device.

BACKGROUND OF THE INVENTION

Gas turbine control devices often use the temperature of the hot gas stream as one of the control parameters. For example, fuel flow to the gas turbine may be regulated as a function of the exhaust gas temperature as sensed by an annular array of thermocouples disposed in the exhaust duct or as a function of the temperature difference between such thermocouples.

If an erroneous temperature reading is provided to or is used by the control device, excessively fuel flow or possibly premature shutdown of the gas turbine could result.

A primary object of this invention is therefore to detect invalid gas turbine hot gas stream temperature readings and to prevent use of such invalid readings by the gas turbine control device.

SUMMARY OF THE INVENTION

Briefly stated, the present invention provides means for determining the validity of each gas turbine hot gas stream temperature sensor reading and for rejecting each reading that is determined to be invalid.

In one form, the invention employs means for determining whether a first temperature sensor reading is within predetermined bounds and for examining the reading of adjacent temperature sensors when the first temperature sensor reading is outside of the predetermined bounds and means for rejecting such out of bounds first temperature sensor reading when such adjacent temperature sensors are within second predetermined bounds.

In preferred form the invention employs a programmable digital computer, input circuit means and temperature sensor select circuit means.

BRIEF DESCRIPTION OF THE DRAWINGS

While the specification concludes with claims particularly pointing out and distinctly claiming the subject matter of this invention, it is believed that the invention will be better understood upon reading the following description of the invention in conjunction with the accompanying drawings, wherein:

FIG. 1 is a diagrammatic representation of a gas turbine system employing the temperature sensor validating means of this invention;

FIG. 2 is a schematic, in block diagram form, showing a gas turbine control arrangement which employs the present invention;

FIG. 3 is a block diagram schematically showing one form of the digital computer of FIG. 2;

FIG. 4 is the flow graph of the program for the digital computer of FIG. 3, which may be used in the present invention;

FIG. 5 is a continuation of the flow graph of FIG. 4;

FIG 6 is a flow graph, like that of FIG. 4, showing the preferred method of and program for use in the present invention; and FIG. 7 is a continuation of the flow graph of FIG. 6.

DESCRIPTION OF THE INVENTION

Referring now to the drawings and particularly to FIG. 1, an exemplary heavy duty gas turbine has been shown generally at 10 as including a compressor 12, a combustor 14, and a turbine 16. Air is delivered to the compressor 12 through a suitable inlet 18 and is compressed and delivered to the combustor 14 through suitable ducting, shown diagrammatically at 20. Fuel is delivered to the combustor 14 through a plurality of suitable fuel nozzles 22 and is burned in the combustor to generate a motive or hot gas stream for driving the turbine 16.

The hot gas stream generated by the combustor 14 is delivered to the turbine 16 through suitable ducting, as diagrammatically shown at 24. The turbine 16 is drivingly connected to the compressor 12 and a load 26, such as a generator, by shaft connections 28 and 30.

A suitable gas turbine control means for controlling the fuel flow to the gas turbine 10 has been shown generally at 32 as being responsive to a speed signal on line 34 which is generated by a suitable speed sensor 36, a flame detector signal on line 38 which is generated by a suitable flame detector 40, and an exhaust gas temperature signal or signals on lines 42, 44, 46, and 48, which are generated by suitable temperature sensors 50 disposed in an annular array in the exhaust duct 52 of the gas turbine. As diagrammatically indicated by line 54, the gas turbine control 32 regulates fuel flow to the nozzles 22 by way of a suitable variable delivery fuel pump or gas valve 56.

For a more detailed description of the gas turbine control 32, reference is made to U.S. Pat. No. 3,520,133, issued July 14, 1970 and assigned to the assignee of the present invention. It should be understood, however, that other gas turbine control arrangements could be used and that the present invention is not limited to use with either the exemplary gas turbine control referenced above or the combustor monitor. Likewise, while the gas turbine 10 has been shown and described as being of the single rotor type, the temperature sensor validation means of this invention may be beneficially employed on gas turbines which employ more than one rotor.

With continued reference to FIG. 1, the combustion monitor has been shown generally at 58 as receiving a temperature signal on lines 60, 42, 44, 46 and 48. The signal on line 60 is generated by a suitable sensor 62 which monitors the temperature of the compressed air leaving compressor 10. The signals on lines 42-48 are indicative of the exhaust gas temperature. As will be hereinafter explained more fully, the combustion monitor means operates on these input signals to determine whether the combustion system (including fuel nozzles 22, combustor 14 and ducting 24) is operating properly. In the event of a detected malfunction, the combustion monitor sends an appropriate shutdown signal on line 64 or alarm signal on line 66 or 68 to the engine control 32.

While only four exhaust gas temperature sensors 50 have been depicted in FIG. 1, it should be understood that such a showing is simplified and that in actual practice as many as 12 or more generally equally spaced temperature sensors would be used in an annular array. The spacing between adjacent sensors is preferably equal and selected such that a hot or cold streak in the hot gas stream which is produced by a malfunction in the combustion system would offset more than one temperature sensor.

While the sensors 50 have been shown as being located at different axial positions relative to the hot gas stream flow, it should be understood that in practice all the sensors 50 would be positioned at approximately the same axial location or, stated another way, general equidistant from the turbine 16.

With reference now to FIG. 2, the combustion monitor 58 has been shown, in one form, as comprising a digital computer 70, a temperature sensor input circuit 72, a temperature sensor select circuit 74, and a display circuit 76. The alarm and shutdown signal lines 64, 66, and 68 preferably include a suitable photo isolator 78 to protect the gas turbine control from any spurious signals from the digital computer 70.

While two exhaust gas temperature sensors 50 have been schematically shown at 80, it should be understood that up to twelve or more sensors would be used in actual practice. Each sensor 50 is connected to the gas turbine control 32 and the temperature sensor input circuit 72 through suitable switching means, such as normally closed contacts 82 and normally open contacts 84 of a relay 86, and through lines 88, 90, 92, and 94.

The compressor discharge temperature sensor 62 is also connected to the input circuit 72 through lines 92, 94 and through switch means, such as normally open contacts 96 of a relay 98.

The temperature sensor select circuit 74 includes address decoder means 100 for receiving a 4-bit binary signal on line 102 from digital computer 70 and for selectively energizing one of relays 86, 98 in response to such signal through a suitable driver or amplifier 104. The decoder means 100 may be a 1 of 16 decoder.

The temperature sensor input circuit 72 has been shown as including a signal amplifier 106 for receiving and amplifying the temperature signal on lines 92, 94, limiter means 108 and an analog to digital converter means 110. The limiter means 108 is adapted to receive the signal output from amplifier 106 on line 112 and limit the input signal to the converter means 110 on line 114, and may comprise a diode limiter and an amplifier with a gain of 1. The converter means 110 is adapted to convert the temperature signal received on line 114 into a suitable 8-bit binary signal for processing by computer 70 in response to a "start computation" signal received from computer 70 on line 116. The converter means 110 is also adapted to provide a signal to the computer 70 through line 118 to indicate when a particular analog to digital conversion has been made. The digital temperature signal generated by converter means 110 is delivered to the computer 70 through a suitable 8-bit binary line 120.

The display circuit 76 includes a binary to binary coded decimal converter means 122 for receiving an 8-bit binary temperature spread signal from digital computer 70 on line 124 and for converting this signal to a 10-bit binary coded decimal signal. This binary coded decimal signal is then delivered to a suitable digital display 126 through lines 128.

A photo isolator 78 may be provided between the combustion monitor and the gas turbine control 32 for lines 64, 66 and 68 and for line 69. Line 69 functions to deliver an enable signal from gas turbine control 32 which is effective to turn on the computer 70.

A suitable reset switch is provided at 130 to selectively ground line 132 and thereby reset the computer 70 or reset or index the program for computer 70 to its "0" position.

With reference now to FIG. 3, the digital computer 70 has been shown in block diagram form as including input means 140, a central processing unit 142 (hereinafter referred to as "CPU"), a clock 144 for the CPU, a memory decoder 146, a state decoder 148, a memory 150, an input/output decoder 152 and output means 154.

The input means 140 is adapted to selectively receive an input signal from one of lines 69, 118, 120 in response to a command signal received on one of lines 160 and deliver this signal to the CPU 142 for further processing on line 162.

As will be understood, the clock means 144 functions to time the sequential operations of the CPU so as to ensure that a new operation is not started until the prior operation has been completed.

When information is to be stored or read out of memory 150, a memory address signal is generated by the CPU and delivered to the memory decoder 146 on line 164. Based on the memory address signal, the memory decoder 146 provides a memory select signal to memory 150 on line 166.

The state decoder means 148, in response to a signal on line 168 from CPU 142, functions to selectively energize the input and output means 140 and 154 by way of lines 170 and 172, respectively, and tells the memory 150 whether it should function in a memory read or memory write mode. When the memory read mode is energized by line 174, the information stored at the location selected by memory decoder 146 is delivered to the CPU 142 on line 176. Likewise, when the memory write mode is energized by line 178, information is delivered on line 180 by the CPU 142 and stored at the memory address selected by memory decoder 146.

The input/output decoder means 152, in response to a signal on line 182 from the CPU, delivers a select signal on one of lines 160 to the input means 140 and the output multiplex means 154 which tells these means which of lines 64, 66, 68, 69, 102, 118, 120 or 124 should be sampled. For example, when line 102 of the temperature sensor select circuit 74 is selected, the coded binary signal indicative of which temperature sensor 50 is to be sampled is delivered on line 184 from the CPU and, hence, through output means 154 and line 102.

In operation, the twelve temperature sensors 50 and the compressor discharge temperature sensor 62 are sequentially sampled on a continuous basis. Their respective temperature readings are amplified, converted to an 8-bit offset binary digital signal and delivered to the CPU by the temperature sensor input circuit 72.

As will be hereinafter described in greater detail and in accordance with the present invention, the computer 70 first determines, at least on a preliminary basis, whether each sensor 50, 62 is operating properly. If it is not, the temperature signal from the defective sensor is disregarded and an alarm signal may be issued on line 64.

If the digital computer 70 determines that an exhaust gas temperature sensor is operating properly, the temperature signal from that sensor is compared with the maximum and minimum exhaust gas temperature readings thus far observed. If the new temperature reading is greater than the previously observed maximum or less than the previously observed minimum, the new temperature reading is substituted therefore. One or more temperature spreads between the temperature readings is computed. If the temperature spread exceeds a predetermined amount or if the rate of change of the temperature spread exceeds a predetermined rate, alarm and shutdown signals are delivered to the gas turbine control 32 on lines 66, 68.

While each connection between the components of FIGS. 2 and 3 have been depicted and described as a single line, it will be understood that those lines that transfer digital information are preferably comprised of multiple conductors.

Flow graphs for the digital computer 70 are shown in FIGS. 4, 5, 6 and 7 for a combustion monitor system employing 12 exhaust gas temperature sensors. In these figures, "$Tcd$" represents the temperature reading of the compressor discharge temperature sensor 62; "$Ti$" represents the temperature reading of one of the exhaust gas temperature sensors 50; "$Hi1$" represents a first predetermined or calculated amount and "$Hi2$" represents a second predetermined or calculated amount; "S" represents the spread between the maximum and minimum observed exhaust gas temperature sensors; "$\Delta s$" represents the rate of change of temperature spread between the maximum and minimum exhaust gas temperature sensor readings; "MAX" represents the maximum observed exhaust gas temperature; "MIN" represents the minimum observed exhaust gas temperature; and $T_{AVG}$ represents the average of the observed exhaust gas temperature readings.

With reference to FIGS. 4 and 5, after enabling and resetting the counter at 1, the compressor discharge temperature is sampled at 200. Next, the first exhaust gas temperature sensor 50 is sampled at 202. At 204, the compressor discharge temperature is compared to a predetermined value, such as 400° F. If the sensed discharge compressor temperature is not greater than 400° F, then the exhaust gas temperature reading is compared to 400° F at 206. If the reading from a particular exhaust gas sensor 50 is less than 400° F, the reading is considered invalid and is not used in computing temperature spread. Where the compressor discharge temperature is greater than 400° F, then the sensed exhaust temperature is compared at 208 to the compressor discharge temperature. Again, if the sensed exhaust temperature is not greater than the compressor discharge temperature, the sensed exhaust temperature is considered invalid and is not used in computing temperature spread.

At 210, each valid exhaust gas temperature reading is compared with the prior maximum exhaust gas temperature reading and the prior minimum exhaust gas temperature reading. If a temperature reading is higher than the previous high reading, it displaces the old maximum reading at 212. Likewise, if the temperature reading is lower than the old low reading, it displaces the old minimum reading at 212. When each of the temperature sensors 50 have been sequentially sampled, the spread or difference between the maximum and minimum sensed temperatures is computed at 214. In the embodiment of FIGS. 4 and 5, the temperature spread "S" is first compared at 216 with a first predetermined amount "$Hi1$". If "S" is greater than "$Hi1$" then a shutdown and alarm signal is generated at 218. If "S" is less than "$Hi1$," then it is compared with a second predetermined amount "$Hi2$" at 220. If "S" is less than "$Hi2$," the cycle is repeated. However, if "S" is greater than "$Hi2$," an alarm may be sounded as at 222 and the absolute value of "S" stored at 224 over an appropriate period of time and the change in the temperature spread over that period computed as at 226. If the change in temperature spread exceeds a predetermined amount, for example 10° F/hour, a shutdown and alarm signal may be generated as at 218. Where the change in temperature spread does not exceed such predetermined amount, the cycle is repeated and each of the sensors 50 is again sampled.

In the flow graph of FIGS. 6 and 7, the compressor discharge temperature is sampled at 230 and compared to an upper and lower limit at 232. If this temperature is outside the limits, it is reflected as a bad thermocouple at 234 and a preselected value, such as 400° F, is used in place of the compressor discharge temperature. If the compressor discharge temperature reading is within the limit of 232 then the first exhaust gas temperature sensor 50 is sampled at 236. The exhaust gas temperature sensor reading is preliminarily screened for validity at 238 by comparing it with an upper and lower limit. If it is within these limits, it is compared with the previous maximum and minimum readings at 240 and if it is greater than the previous maximum or less than the old minimum it displaces such previous reading at 242. If the exhaust gas temperature sensor reading is not within the limits of 238 then an alarm is sounded at 244 and the reading is rejected from further use as being invalid and the next sensor is sampled at 236.

When each of the sensors 50 have been sequentially sampled, the average temperature sensor reading is computed at 246, the high spread or difference between the maximum observed temperature sensor reading and the average temperature sensor reading is computed at 248, and the low spread or difference between the average temperature reading and the minimum temperature reading is computed at 250.

In computing the average temperature sensor reading at 246, it may be desirable to exclude the MAX and/or MIN readings when such average is computed.

At 252, the high spread is compared to a first predetermined or calculated limit and if it exceeds this limit an alarm is sounded and the gas turbine is shutdown at 254. If the high spread is lower than this limit then the low spread is compared to a second limit at 256 and if it is less than this limit and after an appropriate delay, the entire cycle is repeated.

Where the low spread exceeds the limit at 256, it may be desirable to determine with greater precision whether this is due to a faulty thermocouple or whether it is due to a low temperature streak in the hot gas stream which would be indicative of a combustion system malfunction. Such procedure may also be employed in the case of high temperature streaks. At 258, the thermocouples adjacent the thermocouple on which the minimum temperature was observed are examined to determine whether they are within predetermined bounds or limits. If the adjacent readings are high or low then an alarm would be activated and the gas turbine shutdown at 254. If the adjacent thermocouples are within predetermined bounds then the minimum thermocouple reading is rejected at 262 as being invalid and the complete cycle of sampling thermocouples is repeated. In preferred form and with the sensors 50 disposed in an annular array, the two adjacent sensors 50 on each side of the suspect sensor are examined. It will be understood, however, that the exact number of adjacent sensors to be examined will vary depending upon the total number of sensors used and the nature of the expected temperature profile with the postulated combustion system malfunctions.

Combustion system problems can generally be expected to manifest themselves by either hot or cold streaks in the annular hot gas stream. For example, a plugged fuel nozzle would produce a cold streak while a clogged or collapsed cooling or dilution hole or louver would produce a hot streak.

The temperature sensors or thermocouples 50 are preferably provided in sufficient quantity so that the spacing between thermocouples is such that a cold or hot streak produced by a malfunctioning combustion system would affect more than one thermocouple. In this manner, by examining adjacent thermocouples it is possible to detect whether an unusually low or high temperature reading is due to a bad thermocouple or due to a cold streak or hot streak caused by a combustion system malfunction.

While the present invention has been shown in cooperation with the combustor monitor, it should be understood that it may be used or integrated with other gas turbine control devices, such as control 32, that operate on an input of the hot gas stream temperature. In addition, while the present invention has been shown as employing a digital computer 70, it will be understood by those skilled in the art that the digital computer could be replaced by suitable analog circuitry.

Accordingly, while a preferred embodiment of the invention has been depicted and described, such embodiment is intended to be exemplary only and not definitive and it will be appreciated by those skilled in the art that many substitutions, alterations and changes may be made thereto without departing from the fundamental theme of the invention.

What is claimed is:

1. A gas turbine system having a compressor, a combustion system for receiving fuel and pressurized air from said compressor and for generating an annular hot gas stream, a turbine driven by the hot gas stream and operative to drive said compressor, an exhaust duct for exhausting said hot gas stream, means for controlling the operation of the gas turbine in response to various parameters of gas turbine operation including the temperature of the hot gas stream as sensed by a plurality of temperature sensors, said temperature sensors disposed in an annular array in said exhaust duct with the spacing between adjacent temperature sensors being generally equal and selected such that a temperature streak caused by a combustion system malfunction would affect at least two adjacent temperature sensors, and means for determining the validity of each temperature sensor reading prior to use by said controlling means, said validity determining means being operative to examine the temperature readings of temperature sensors that are adjacent to a particular temperature sensor having a reading which is outside of first predetermined bounds and for rejecting the reading from said particular temperature sensor when each said adjacent temperature sensor is within second predetermined bounds.

* * * * *